United States Patent

Ota et al.

[11] Patent Number: 5,984,643
[45] Date of Patent: Nov. 16, 1999

[54] VARIABLE CAPACITY SWASH-PLATE-TYPE REFRIGERANT COMPRESSOR

[75] Inventors: Masaki Ota; Yasunori Makino; Masaru Hamasaki; Masayoshi Hori, all of Kariya, Japan

[73] Assignee: Kabushiki Kaisha Toyoda Jidoshokki Seisakusho, Kaiya, Japan

[21] Appl. No.: 09/154,794

[22] Filed: Sep. 17, 1998

[30] Foreign Application Priority Data

Sep. 17, 1997 [JP] Japan .................................. 9-251567

[51] Int. Cl.⁶ .................................................. F04B 25/04
[52] U.S. Cl. .............................. 417/269; 92/12.2; 92/57; 92/71
[58] Field of Search ........................... 92/12.2, 57, 71; 417/269

[56] References Cited

U.S. PATENT DOCUMENTS

| | | | |
|---|---|---|---|
| 4,979,877 | 12/1990 | Shimizu | 417/269 X |
| 5,228,841 | 7/1993 | Kimura et al. | 417/269 X |
| 5,316,446 | 5/1994 | Kimura et al. | 417/269 |
| 5,533,871 | 7/1996 | Takenaka et al. | 417/269 |
| 5,645,405 | 7/1997 | Ota et al. | 417/269 |

FOREIGN PATENT DOCUMENTS

| | | |
|---|---|---|
| 2-124280 | 10/1990 | Japan . |
| 7-91366 | 4/1995 | Japan . |
| 7-189896 | 7/1995 | Japan . |

*Primary Examiner*—Hoang Nguyen
*Attorney, Agent, or Firm*—Woodcock Washburn Kurtz Mackiewicz & Norris LLP

[57] ABSTRACT

A variable capacity swash-plate-type refrigerant compressor incorporating therein single-headed pistons reciprocating in the cylinder bores to compress refrigerant gas, a drive shaft rotatably supported and driven by an external drive source, a swash-plate element mounted around the drive shaft and rotated by the drive shaft so that the rotation of the swash-plate element causing the reciprocation of the single-headed pistons, and a hinge mechanism arranged between the drive shaft and the swash-plate element to permit the swash-plate element to change its angle of inclination with respect to the axis of rotation of the drive shaft to thereby adjustably change the delivery capacity of the compressor, the swash-plate element being constituted by a swash-plate-body member made of an aluminum alloy material and functioning as a sliding contact member cooperating with the single-headed pistons via shoes, and a guide-bracket member made of an iron based material and functioning as a hinge mechanism forming member. The swash-plate-body member and the guide-bracket member are connected together by press-fitting and prevented, by a rotation-preventing unit, from being relatively rotated against one another.

10 Claims, 3 Drawing Sheets

VARIABLE CAPACITY SWASH-PLATE-TYPE REFRIGERANT COMPRESSOR

BACKGROUND OF THE INVENTION

1. Field of the Invention

The present invention generally relates to a variable capacity swash-plate-type refrigerant compressor adapted for being incorporated in a climate control system of a vehicle. More particularly, the present invention relates to an improved construction of a swash-plate element accommodated in the variable capacity swash-plate-type refrigerant compressor.

2. Description of the Related Art

Japanese Unexamined Patent Publication (Kokai) No. 7-189896 (JP-A-7-189896) discloses a typical variable swash-plate-type refrigerant compressor provided with a cylinder block in which a plurality of cylinder bores are formed in parallel with one another. The compressor is provided with a housing arranged to close a front end of the cylinder block and defining therein a crank chamber. The rear end of the cylinder block is closed by a cylinder head having therein a suction chamber and a discharge chamber. The compressor is further provided with a drive shaft rotatably supported by the housing and the cylinder block and arranged to extend through the crank chamber. The drive shaft has a lug-plate fixedly mounted thereon and has a sleeve element slidably mounted thereon to be slidable along the axis of rotation of the drive shaft. The sleeve element is provided with a pair of trunnions projecting laterally with respect to the axis of rotation of the drive shaft so that the trunnions are engaged in a pair of bores, respectively, formed in a swash plate element consisting of two threadedly engaged parts. Thus, the swash plate element is rotatable with the drive shaft, and is pivotable about the trunnions. The swash plate element is provided with guide pins fixed thereto via brackets which are formed integrally in a front portion of the swash plate element. The guide pins are movably engaged in respective bores formed in a pair of support arms extending rearward from the rear face of the lug plate, and the engaging portion of the guide pins and the support arms constitutes a hinge mechanism to control the pivotal motion of the swash plate element about the trunnions.

Japanese Unexamined Patent Publication (Kokai) No. 7-91366 (JP-A-7-91366) discloses a variable capacity swash plate type compressor including a housing, having a crank chamber formed therein, and a cylinder block provided with a plurality of cylinder bores in which pistons are reciprocated. The variable capacity swash plate type compressor also includes a drive shaft rotatably supported, by the housing and the cylinder block via bearings, to extend through the crank chamber. A rotor fixedly mounted on the drive shaft has a rearwardly extending support arm in which a hinge ball extending from a swash plate via a rod is movably engaged. The support arm and the hinge ball constitute a hinge mechanism K, and the swash plate is provided with a centrally formed specific bore and is directly mounted on the drive shaft which is arranged to extend through the particular bore of the swash plate. Namely, the swash plate mounted on the drive shaft is capable of pivoting on the drive shaft, via the hinge mechanism, to change its angle of inclination with respect to a plane perpendicular to the axis of rotation of the drive shaft. Thus, the compressor of JP-A-7-91366 does not need a sleeve element and the trunnions which are usually required between the swash plate and the drive shaft. Further, the swash plate of JP-A-7-91366 is formed as one integral element having both a shoe-engaging portion and a portion of the hinge mechanism.

In the former compressor of JP-A-7-189896, the swash plate is made of an assembly having a first portion contributing to a capacity change of the compressor and a second portion contributing to an engagement between the swash plate and the pistons reciprocating in the cylinder bores via shoes. The first portion and the second portion are threadedly engaged with one another to form the assembly. Thus, the first and second portions must be formed with threaded portions through an accurate and precise machining operation requiring a large amount of time. Further, the threads of the first and second portions of the swash plate must be formed so that the threaded portions are tightened when the swash plate is rotated by the drive shaft. Therefore, when the drive shaft of the compressor is connected to and driven by a vehicle engine, it is necessary to determine the rotating direction of the vehicle engine in advance to ensure that the first and second portions of the swash plate can be prevented from being loosened by the rotation of the swash plate per se. If the rotating direction of a vehicle engine to which the drive shaft of the compressor is connected is opposite to the direction causing tightening of the threaded portions of the first and second portions of the swash plate, the thread direction of the first and second portions of the swash plate of the compressor must be changed during the production of the swash plate. This is very cumbersome.

Further, in the latter compressor of JP-A-7-91366, the swash plate is formed as one integral element having both the shoe-engaging portion and the hinge-mechanism-forming portion. Thus, the production of the integral element type swash plate must be rather complicated. Nevertheless, it is required that the shoe-engaging portion exhibits a good sliding property when being slidably engaged with the shoes held by respective pistons, but the hinge-mechanism-forming portion must exhibit a sufficient mechanical strength when being movably engaged with the rotor fixedly mounted on the drive shaft. Namely, the integral element type swash plate must be produced so as to satisfy two different requirements. As a result, the selection of a metallic material, of which the integral element type swash plate is made, must become difficult, and complete satisfaction of the above-mentioned two different requirements cannot be obtained.

Japanese Unexamined Utility Model Publication (Kokai) No. 2-124280 (JU-A-2-124280) discloses a variable capacity swash plate type refrigerant compressor having double-headed reciprocating pistons slidable in respective cylinder bores to compress refrigerant gas. The compressor of JU-A-2-124280 accommodates therein a mechanism for changing an angle of inclination of the swash plate, which is different from the hinge mechanisms of the afore-mentioned compressors of JP-A-7-189896 and JP-A-7-91366. Further, the compressor of JU-A-2-124280 is characterized in that the swash plate is designed for the mass production thereof. Namely, the swash plate of JU-A-2-124280 is formed as one integral element by assembling a swash plate body to be slidingly engaged with the shoes of the double-headed pistons with a rotational-force-transmitting portion to be connected to a connecting portion of a drive shaft of the compressor via a guide pin. More specifically, the swash plate body is tightly fitted on the rotational-force-transmitting portion.

Nevertheless, any refrigerant compressor used for a vehicle climate control system must be subjected to a strong torque acting on the fitting portion of the swash plate body and the rotational-force-transmitting portion due to both thermal load and a large change in the rotating speed of the compressor. Therefore, the fitting portion of the two elements of the swash plate might be loosened during a long operation of the compressor even if a press-fitting method is employed.

The double-headed piston type compressor of JU-A-2-124280 is provided with a swash-plate-receiving region for the swash plate, which is constantly kept at a relatively low temperature by the refrigerant gas before compression. Thus, even if only the swash-plate body engaged with the shoes is made of aluminum material having a good slidable property, and the rotational-force-transmitting portion is made of iron material, the swash-plate body is not adversely affected by the temperature in the swash plate receiving region. However, if a swash plate consisting of a swash-plate body made of aluminum alloy material, and a rotational-force-transmitting portion made of an iron based material is accommodated in a single-headed piston type compressor provided with a crank chamber into which a high pressure and high temperature compressed gas may be introduced in response to an adjustment of the angle of inclination of the swash-plate for the purpose of capacity control, the swash-plate body might be subjected to a high temperature to cause thermal expansion thereof resulting in loosening of the press-fitting portion of the swash-plate-body and the rotational-force-transmitting portion.

SUMMARY OF THE INVENTION

Therefore, an object of the present invention is to provide a variable capacity swash-plate-type refrigerant compressor provided with a swash-plate element able to eliminate problems encountered by the conventional swash-plate elements accommodated in various conventional variable capacity refrigerant compressors.

Another object of the present invention is to provide a variable capacity refrigerant compressor provided with a swash-plate element having a construction suitable for mass production and being able to exhibit a good and reliable performance.

In accordance with the present invention, there is provided a variable capacity swash-plate-type refrigerant compressor which comprises:
  a cylinder block having front and rear ends, a central axis extending through the front and rear ends, and a plurality of cylinder bores arranged around the central axis in parallel with one another;
  a housing arranged to close the front end of the cylinder block and defining a crank chamber therein;
  an axial drive shaft rotatably supported by the cylinder block and the housing;
  a cylinder head arranged to close the rear end of the cylinder block via a valve plate assembly and defining a suction chamber for refrigerant gas before compression and a discharge chamber for the refrigerant gas after compression;
  a plurality of single-headed piston elements slidably arranged in the plurality of cylinder bores, respectively; and
  a swash-plate element mounted around the drive shaft within the crank chamber to be operatively engaged with each of the plurality of single-headed pistons;
  wherein the swash-plate element comprises:
    a swash-plate-body member movably engaged with shoes held by the respective single-headed piston elements; and
    a guide-bracket member arranged to cooperate with the drive shaft to form a part of a capacity-changing unit for adjustably changing the delivery capacity of the compressor, the swash-plate-body member and the guide-bracket member being provided with a first and a second portions, respectively, which are mutually complementary and connected by press-fitting; and
    a rotation-preventing unit for preventing the swash-plate-body portion and the guide-bracket portion from rotating relative to one another.

The first and second portions of the swash-plate-body member and the guide-bracket member are preferably formed by coaxial cylindrical inner and outer surface portions.

The guide-bracket member of the swash-plate element may include a sleeve element slidably mounted on the drive shaft and a hinge-forming portion movably engaged with a corresponding hinge-forming portion provided for the drive shaft.

Alternatively, the guide-bracket member of the swash-plate element may include means for permitting the guide-bracket member to be in slidable direct connection with a cylindrical surface of the drive shaft and to turn about an axis perpendicular to the axis of rotation of the drive shaft.

The rotation-preventing unit of the swash-plate element may comprise a positive engaging portion provided between the swash-plate-body member and the guide-bracket member, the positive engaging portion including a projection formed in either one of the swash-plate-body member and the guide-bracket member and a complementary recess formed in the other of the swash-plate-body member and the guide-bracket member.

Preferably, the swash-plate-body member of the swash-plate element is made of an aluminum alloy material, and the guide-bracket member of the swash-plate element is made of an iron based material.

Preferably, the aluminum alloy material of which the swash-plate-body portion is made is a light-weight, hyper-eutectic aluminum-silicon alloy exhibiting a large resistance against abrasion.

The swash-plate element preferably includes a first predetermined portion formed in the guide-bracket member so as to be arranged adjacent to a top dead center of the swash-plate element, a second predetermined portion formed in the guide-bracket member so as to be arranged adjacent to a bottom dead center of the swash-plate element, and a weight element attached to the second predetermined portion to form a counterweight against the weight of the first predetermined portion, the weight element being arranged to be parallel with an outer circumferential portion of the swash-plate-body member, and being attached to the second predetermined portion of the guide-bracket-member by a connecting unit which is also engaged with the swash-plate-body member so that the connecting unit constitutes the rotation-preventing-unit.

BRIEF DESCRIPTION OF THE DRAWINGS

Referring to FIG. 1, a variable capacity swash-plate-type compressor is provided with a cylinder block 1 having front and rear ends axially spaced apart from one another. The front end of the cylinder block 1 is closed by a housing 2, and the rear end of the cylinder block 1 is closed by a cylinder head 3 via a valve plate 4. The housing 2, the cylinder block 1, and the cylinder head 3 are axially and tightly combined together by a plurality of screw bolts 12. The housing 2 defines a crank chamber 5 therein which is arranged in front of the front end of the cylinder block 1. The housing 2 and the cylinder block 1 support a drive shaft 6 to be rotatable about an axis of rotation thereof. Namely, the drive shaft 6 is rotatably supported by a bearing 7a mounted in the housing 2 and a bearing 7b mounted in the cylinder block 1. A front end of the drive shaft 6 extends through a central bore of the housing 2, so that the front end is connectable to a vehicle engine via a solenoid clutch (not shown in FIG. 1) and a drive power transmitting unit, such as a pulley and a belt transmitting unit. Thus, the drive shaft 6 of the compressor is driven by the vehicle engine. A shaft sealing device 7c is arranged adjacent to the front bearing 7a.

Figure 1:
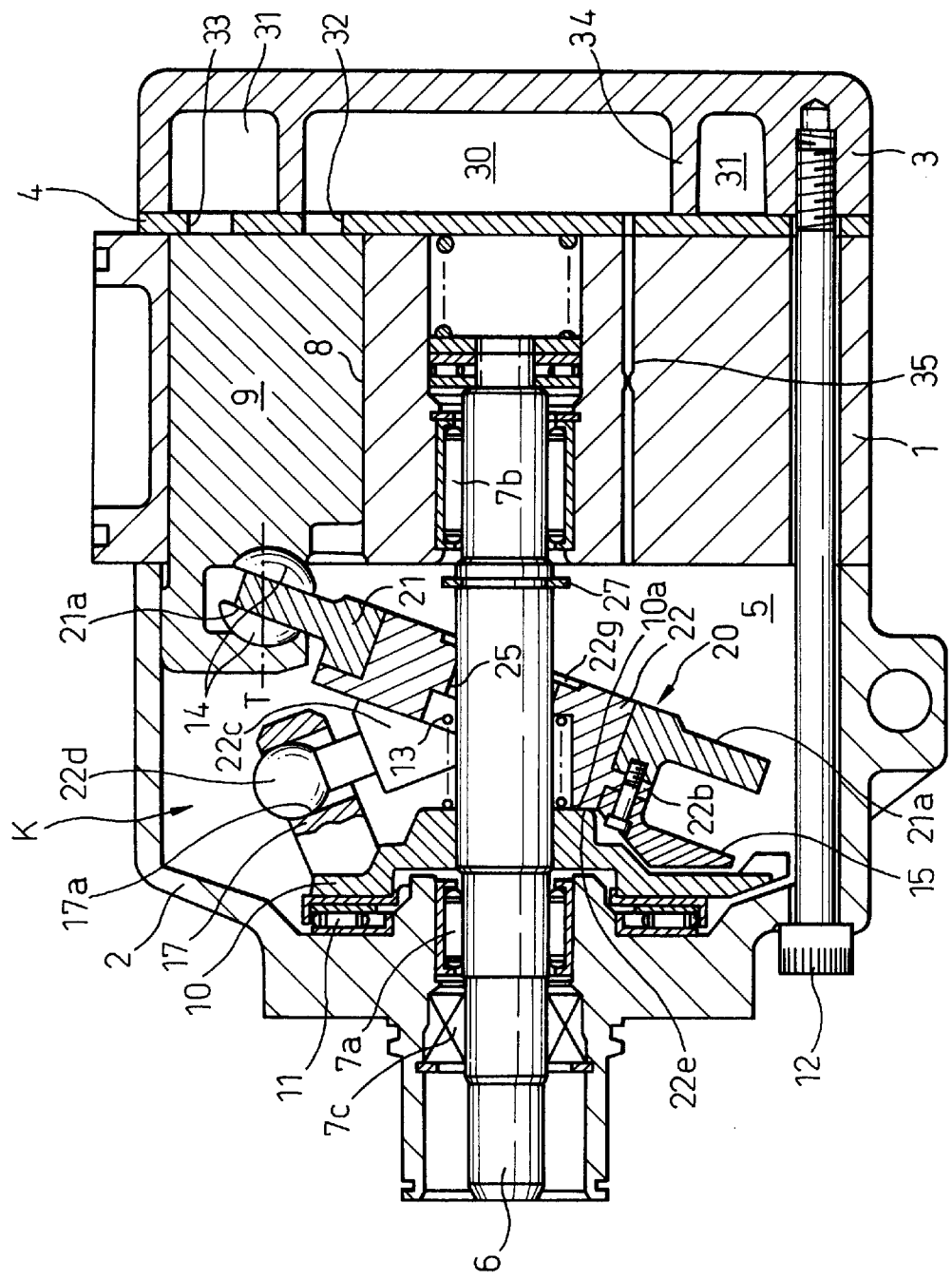
FIG. 1 is a longitudinal cross-sectional view of a variable capacity swash-plate-type compressor according to an embodiment of the present invention.

The cylinder block 1 is provided with a plurality of axial cylinder bores 8 arranged around the drive shaft 6. The cylinder bores 8 are arranged to be equiangularly circumferentially spaced apart from one another, and receive single-headed pistons 9, respectively, so as to permit the pistons 9 to be slidably reciprocated within respective cylinder bores 8.

A rotor element 10 is fixedly mounted on the drive shaft 6 within the crank chamber 5, and is rotatably supported by an inner wall face of the housing 2 via a thrust bearing 11. Thus, the rotor element 10 can rotate together with the drive shaft 6 about the axis of rotation of the drive shaft 6.

A swash-plate element 20 is mounted on the drive shaft 6 within the crank chamber 5 at a position behind the rotor element 10, and is axially urged toward a position adjacent to the front end of the cylinder block 1 by a spring element 13 interposed between the rotor element 10 and the swash plate element 20.

Figure 2:
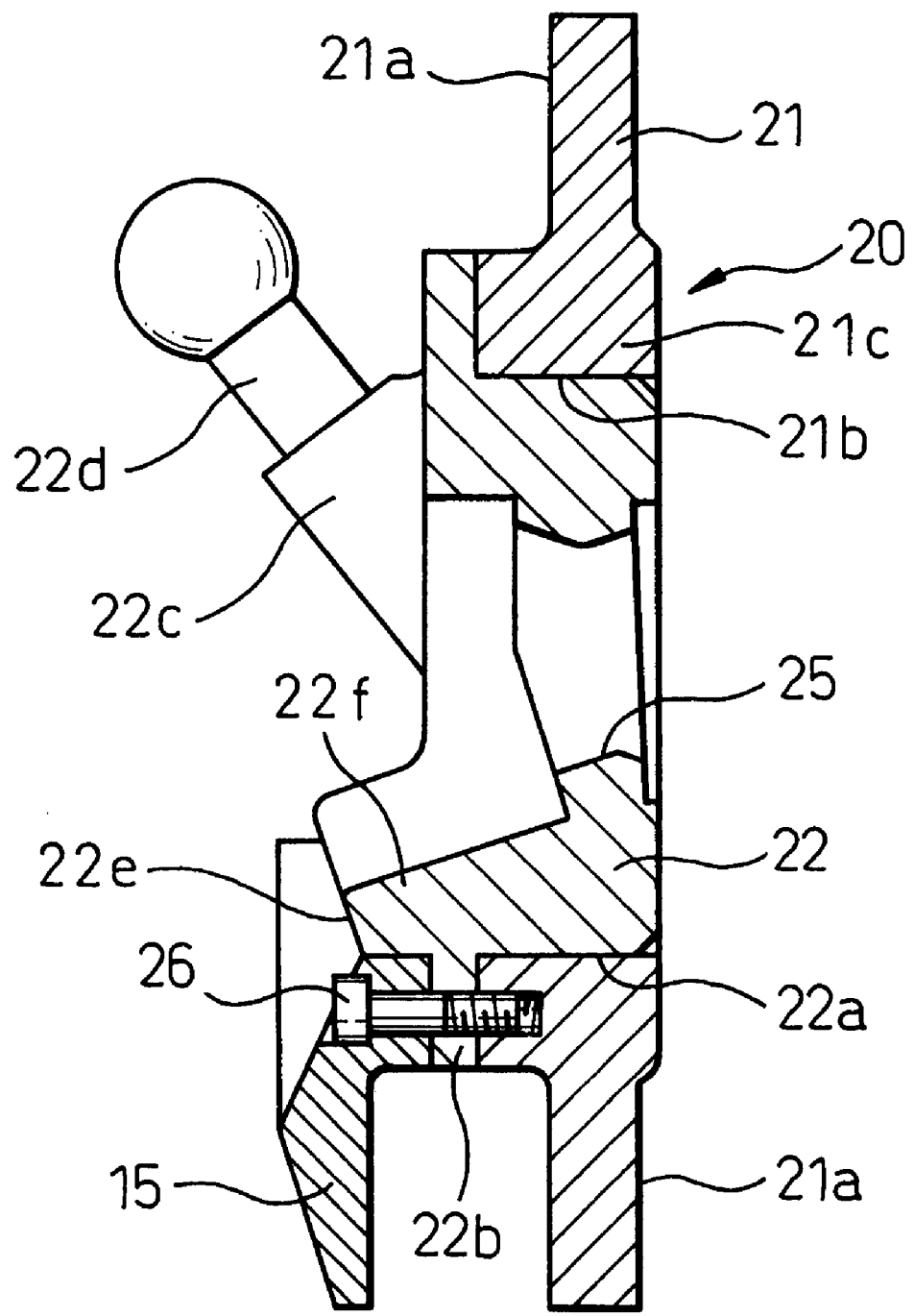
FIG. 2 is a cross-sectional view of a swash-plate element according to the present invention and accommodated in a variable capacity swash-plate-type compressor.

As best shown in FIG. 2, the swash-plate element 20 is substantially constituted by a swash-plate-body member 21 in the shape of an annular element having a central axis, and a guide-bracket member 22 in the shape of a cylindrical element having a bore at its central portion. The swash-plate-body member 21 is made of aluminum alloy material, such as hyper-eutectic aluminum-silicon alloy, and provided with a pair of opposite sliding surfaces 21a, 21a formed in an outer periphery of the swash-plate-body member 21 as opposite flat parallel faces extending circularly about the central axis. The sliding surfaces 21a, 21a of the swash-plate-body member 21 are slidably engaged with a pair of shoes 14, 14 each having a flat sliding face and a semi-spherical outer face. Namely, the flat sliding face of each shoe 14 is in sliding contact with the flat sliding surface 21a of the swash-plate-body element 21. The semi-spherical outer face of each of the pair of shoes 14 is slidably fitted in a round recess of each single-headed piston element 9.

The guide-bracket member 22 of the swash-plate element 20 is made of an iron based material, and is provided with a cylindrical surface portion 22a which is press-fitted in a complementary cylindrical bore portion 21b of a thick portion 21c of the swash-plate-body member 21 by a predetermined press-fitting allowance. The guide-bracket member 22 is also provided with a circular flange portion 22b formed therein at its front side, and a pair of brackets 22c, 22c extending frontward from the flange portion 22b to have a predetermined angle of inclination with respect to the central axis thereof. When the swash-plate element 20 is mounted on the drive shaft 6, the brackets 22c, 22c of the guide-bracket member 22 extend toward a part of the rotor element 10, and are arranged so that the top dead center "T" of the swash-plate-body member 21 is circumferentially positioned at substantially the middle of the two brackets 22c, 22c. Each of the brackets 22c, 22c is provided with a guide pin 22d having an inner base end fixed to the bracket 22c and a ball end at its outer free end. The brackets 22c, 22c, and the guide pins 22d having the ball ends constitute a part of a hinge mechanism "K" functioning as a capacity changing mechanism through cooperation with the rotor element 10.

The guide-bracket 21 of the swash-plate element 20 is provided with a through-bore 25, at the center thereof, which is not a single cylindrical bore but is formed as a curved bore including a plurality of bore portions of different diameters, so that the swash-plate-body member 21 of the swash-plate element 20 can move to change its angle of inclination on the drive shaft 6 with respect to a plane perpendicular to the axis of rotation of the drive shaft 6.

The swash-plate element 20 is further provided with a counterweight member 15 attached to the guide-bracket 22 at a predetermined position located adjacent to a bottom dead center of the swash plate element 20 which is diametrically opposite to the afore-mentioned top dead center "T" (FIG. 1) of the swash-plate element 20. The counterweight member 15 is affixed to the predetermined position of the guide-bracket member 22 by a headed screw member or members 26 which is screwed into the flange portion 22b of the guide-bracket member 22 and into a cylindrical boss portion of the swash-plate-body member 21. Namely, the headed screw member 26 is used for fixing the counterweight 15 to the swash-plate element 20 and additionally functions as a rotation-preventing device for preventing any relative motion between the swash-plate-body member 21 and the guide-bracket member 22 which are connected together by press-fitting.

In FIG. 2, the guide-bracket member 22 of the swash-plate element 20 is further provided with a front protrusion 22f formed to project from a lower portion thereof around the bore 25 and to define an inclined end face 22e. The inclined end face 22e of the guide-bracket member 22 is arranged to come into contact with a predetermined end face portion 10a of the rotor element 10, as clearly shown in FIG. 1, when the swash-plate element 21 is moved to a maximum angle of inclination with respect to the afore-mentioned plane perpendicular to the axis of rotation of the drive shaft 6. That is, the inclined end face 22e of the protrusion 22f of the guide-bracket member 22 functions to determine the maximum angle of inclination of the swash-plate element 20.

On the other hand, as will be understood from FIG. 1, a minimum angle of inclination of the swash-plate element 20 is determined by an engagement of a counter-bore portion 22g of the guide-bracket member 22 with a circlip member 27 mounted on the drive shaft 6 when the swash-plate element 20 is moved to reduce its angle of inclination.

In FIG. 1, the rotor element 10 is provided with a pair of support arms 17, 17 formed in a part thereof and constituting a part of the hinge mechanism "K". The pair of support arms 17, 17 are arranged to rearwardly project to a position capable of cooperating with the pair of guide pins 22d, 22d of the swash-plate element 20. Namely, each of the pair of support arms 17, 17 is provided with a through-bore 17a formed in an end portion thereof to receive the ball end of each guide pin 22d. Therefore, each of the bores 17a, 17a is disposed so that a central axis thereof lies in a plane extending in parallel with an imaginary plane containing the axis of rotation of the drive shaft 6 and the top dead center "T" of the swash-plate-body member 21 of the swash-plate element 20. Further, as clearly shown in FIG. 1, each guide bore 17a is formed so as to extend radially inwardly within the crank chamber 5 and to be inclined from an actual radial line, with respect to the axis of rotation of the drive shaft 6. The inclination of the guide bores 17a, 17a of the pair of support arms 17, 17 is designed so as to keep the top dead center of the respective pistons 9 unchanged even if the angle of inclination of the swash-plate element 20 is changed, due to a slidable engagement of the guide bores 17a, 17a and the ball ends of the guide pins 22d, 22d.

In FIG. 1, the cylinder head 3 defines therein a suction chamber 30 and a discharge chamber 31 which are separated by a suitable partition wall 34. The valve plate 4 is provided with a plurality of suction ports 32 for providing a fluid communication between the respective cylinder bores 8 and the suction chamber 30, and a plurality of discharge ports 33 for providing a fluid communication between the respective cylinder bores 8 and the discharge chamber 30. The suction ports 32 and the discharge ports 33 are closed by suction valves and discharge valves (not shown in FIG. 1) arranged on opposite end faces of the valve plate 4, so that compression chambers are formed in the respective cylinder bores 8 between the ends of the single-headed pistons 9 and the valve plate 4.

A gas-withdrawing passage 35 having a part thereof formed as an orifice is arranged in the cylinder block 1 to extend between the crank chamber 5 and a suction pressure region within the compressor, e.g., the suction chamber 30.

In the variable capacity swash-plate-type compressor, when the drive shaft 6 is rotationally driven by an external drive source, i.e., a vehicle engine, the swash-plate element 20 is rotated together to cause a reciprocating motion of the respective single-headed pistons 9 via the shoes 14, 14 with respect to the respective cylinder bores 8. Namely, when the rotation of the swash-plate element 20 causes a wobbling motion of the swash-plate-body element 21 thereof, and accordingly, the flat sliding surfaces 21a, 21a inclined from a plane vertical to the axis of rotation of the swash-plate element 20 apply a pressure to the respective shoes 14, 14 so that the respective single-headed pistons 9 is reciprocated in the respective cylinder bores 8. The reciprocation of the single-headed pistons 9 causes suction of refrigerant gas from the suction chamber 30 into the compression chambers and discharge of the refrigerant gas after compression from the compression chambers into the discharge chamber 31. An amount of the refrigerant gas discharged from the respective compression chambers in the cylinder bores 8 is controlled by adjustably changing the angle of inclination of the swash-plate element 20, and the change in the angle of inclination of the swash-plate element 20 with respect to the plane vertical to the axis of rotation of the swash-plate element 20 is effected by a capacity control valve (not shown in FIG. 1) which adjustably changes a gas pressure prevailing in the crank chamber 5. Namely, when the gas pressure in the crank chamber 5 is increased by the action of the capacity control valve, a back pressure action on each of the single-headed pistons 9 increases to reduce the angle of inclination of the swash-plate-body member 21 of the swash-plate element 20. Thus, the ball ends of the guide pins 22d, 22d fixed to the guide-bracket member 22 rotationally slide in the guide bores 17a, 17a of the support arms 17, 17, and approach the drive shaft 6, and simultaneously, the guide-bracket member 22 of the swash-plate element 20 axially slides rearward along the drive shaft 6 while approaching the circlip 27, via a sliding contact of the bore wall of the through-bore 25 of the guide-bracket member 22 and the cylindrical surface of the drive shaft 6. The rearward sliding of the guide-bracket member 22 causes the swash-plate-body member 21 to turn counterclockwise while reducing the angle of inclination of the swash-plate-body member 21. The coil spring 13 assists the counterclockwise turning of the swash-plate-body member 21. Accordingly, an amount of stroke of reciprocation of the respective single-headed pistons 9 is reduced so as to reduce the discharge amount of the refrigerant gas from the compression chambers of the respective cylinder bores 8. As a result, the delivery capacity of the compressor is reduced.

When the pressure prevailing in the crank chamber 5 is reduced by the control action of the capacity control valve, the back pressure acting on the respective single-headed pistons 9 is reduced. Accordingly, the swash-plate-body member 21 of the swash-plate element 20 is moved to its angle of inclination by the guide of the hinge mechanism "K" in which the ball ends of the guide pins 22d, 22d rotationally slide in the guide bores 17a, 17a of the support arms 17, 17 while moving away from the drive shaft 6. Simultaneously, the guide-bracket member 22 of the swash-plate element 20 slides frontward along the surface of the drive shaft 6 due to the slide contact of the wall surface of the through-bore 25 and the cylindrical surface of the drive shaft 6, and turns clockwise so as to increase the angle of inclination of the swash-plate-body member 21. The sliding of the guide-bracket 22 of the swash-plate element 20 is performed against the spring force exhibited by the spring element 13. Thus, the respective single-headed pistons 9 are permitted to increase the amount of stroke of the reciprocation in the cylinder bores 8, and accordingly, the amount of discharge of the refrigerant gas from the compression chambers into the discharge chamber 31 is increased. As a result, the delivery capacity of the compressor is increased.

During the operation of the afore-described variable capacity swash-plate-type compressor, when a thermal load applied to the compressor is large, and when the rotating speed of the compressor is suppressed to a relatively low speed, a large torque acts on the swash-plate element 20 by which the swash-plate-body member 21 is relatively rotated against the guide-bracket member 22 at the press-fitting portion of both members 21 and 22. Nevertheless, the relative rotation of the swash-plate-body member 21 with respect to the guide-bracket member 22 at the press-fitting portion of the two members 21 and 22 can be surely prevented by the screw member or members 26.

It should be understood that, according to the present invention, the swash-plate element 20 is constituted by the swash-plate-member 21 made of an aluminum alloy material and the guide-bracket member 22 made of an iron based material. Thus, the production of the two separate members 21 and 22 can be relatively easily achieved, and the assembly of the swash-plate-body member 21 and the guide-bracket member 22 can be achieved only by press-fitting the former member 21 onto the latter member 22. Further, the use of the aluminum alloy material for the swash-plate-body member 21 can be effective for obtaining a good slidable property at the flat sliding surfaces 21a, 21a thereof, and the use of the iron based material for the guide-bracket member 22 can be effective for obtaining a large mechanical strength and large abrasion-resisting property at the sliding contact portion of the member 22 and the drive shaft 6. Namely, the swash-plate element 20 of the present invention can be made of the best materials without being adversely affected by a large increase in the temperature within the crank chamber 5.

Figure 3:
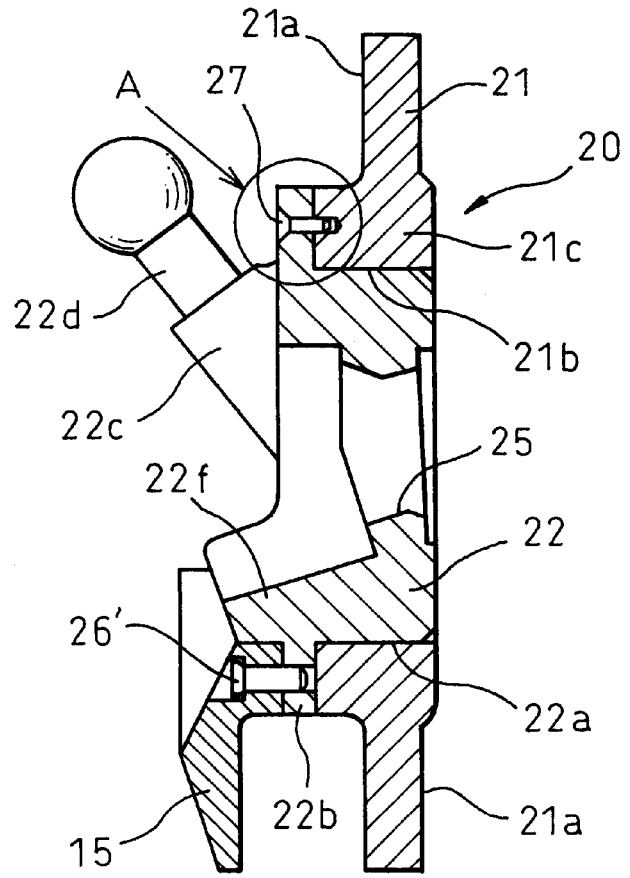
FIG. 3 is a cross-sectional view of a swash-plate element according to a different embodiment of the present invention; and, FIG. 4 is a partial cross-sectional view of the portion "A" of FIG. 3, illustrating a modification of a rotation-preventing unit incorporated in the swash-plate element of the present invention.

In the described embodiment, although the rotation-preventing unit for preventing a relative rotation between the swash-plate body member 21 and the guide-bracket member 22 is constituted by the screw member or members 26 to fix the counterweight 15 to the swash-plate element 20, a different rotation-preventing unit may alternatively be used. For example, as shown in portion "A" of FIG. 3, a knocking pin or rivet 27 may be used for providing the two members 21 and 22 with a non-rotating rigid connection therebetween. Then, the counterweight 15 may be attached to the flange portion 22b of the guide-bracket member 22 by a rivet 26', which is not engaged with the swash-plate-body member 21 of the swash-plate element 20.

Figure 4:
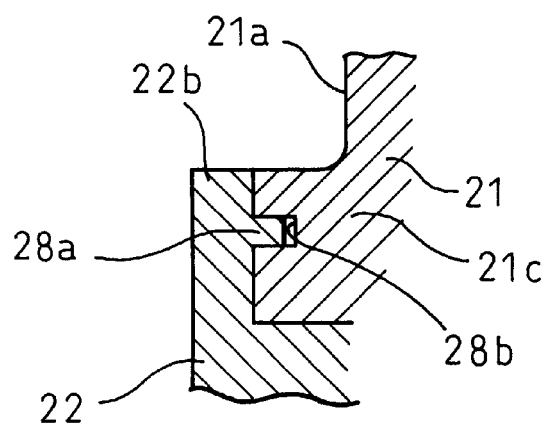

Further, as shown in FIG. 4, a positive engagement of a convex portion 28a and a concave portion 28b may be provided between the flange portion 22b or the boss portion 22f of the guide-bracket member 22 and the thick portion 21c of the swash-plate-body portion 21 may be used. Furthermore, though not shown in any of the drawings, a flat contacting portion may be arranged in the press-fitting portion of the cylindrical surface portion 22a of the guide-bracket member 22 and the cylindrical bore 21b of the thick portion 21c of the swash-plate-body portion 21, so that a relative rotation between the two members 21 and 22 can be prevented by the flat contacting portion.

From the foregoing description of the preferred embodiment of the present invention, it will be understood that in accordance with the present invention, since the swash-plate element incorporated in a variable capacity single-headed piston type refrigerant compressor is constituted by two separate members, i.e., the swash-plate-body member and the guide-bracket member which are assembled together by press-fitting and prevented from being relatively rotated therebetween by the rotation-preventing unit, the compressor may be accommodated in a vehicle climate control system and driven by a vehicle engine without taking into consideration the rotating direction of the vehicle engine. The swash-plate element can exhibit a large durability against heat over a long operation life of the compressor.

Further, the swash-plate element according to the present invention can satisfy all of the requirements from the viewpoint of a good sliding property at the sliding contact portion between the swash-plate element and the shoes of the pistons, and of a large mechanical strength and a large abrasion resisting property at the sliding contact portion between the swash-plate element and the drive shaft.

It should be understood that various changes and modifications will be made by persons skilled in the art without departing from the scope and spirit of the invention as claimed in the accompanying claims.

What we claim:

1. A variable capacity swash-plate-type refrigerant compressor comprising:
   a cylinder block having front and rear ends, a central axis extending through said front and rear ends, and a plurality of cylinder bores arranged around said central axis to be parallel with one another;
   a housing arranged to close said front end of said cylinder block and defining a crank chamber therein;
   an axial drive shaft rotatably supported by said cylinder block and said housing;
   a cylinder head arranged to close said rear end of said cylinder block via a valve plate assembly and defining a suction chamber for refrigerant gas before compression and a discharge chamber for the refrigerant gas after compression;
   a plurality of single-headed piston elements slidably arranged in said plurality of cylinder bores, respectively; and
   a swash-plate element mounted around said drive shaft within said crank chamber to be operatively engaged with each of said plurality of single-headed pistons;
   wherein said swash-plate element comprises: a swash-plate-body member movably engaged with shoes held by said respective single-headed piston elements; and
   a guide-bracket member arranged to cooperate with said drive shaft to form a part of a capacity-changing means for adjustably changing the delivery capacity of said compressor, said swash-plate-body member and said guide-bracket member being provided with a first and a second portions, respectively, which are mutually complementary and connected by press-fitting; and
   a rotation-preventing unit for preventing said swash-plate-body portion and said guide-bracket portion from rotating relative to one another.

2. A variable capacity swash-plate-type refrigerant compressor according to claim 1, wherein said first and second portions of said swash-plate-body member and said guide-bracket member are formed by coaxial cylindrical inner and outer surface portions.

3. A variable capacity swash-plate-type refrigerant compressor according to claim 1, wherein said guide-bracket member of said swash-plate element includes a means for permitting said guide-bracket member to be in slidable direct connection with a cylindrical surface of said drive shaft and to turn about an axis perpendicular to an axis of rotation of said drive shaft.

4. A variable capacity swash-plate-type refrigerant compressor according to claim 3, wherein said means for permitting said guide-bracket member to be in slidable direct connection with a cylindrical surface of said drive shaft and to turn about an axis perpendicular to the axis of rotation of said drive shaft comprises a wall surface of a curved bore centrally formed in said guide-bracket member.

5. A variable capacity swash-plate-type refrigerant compressor according to claim 1, wherein said rotation-preventing means of said swash-plate element comprises a positive engaging portion provided between said swash-plate-body member and said guide-bracket member, said positive engaging portion including a projection formed in either one of said swash-plate-body member and said guide-bracket member and a complemental recess formed in the other of said swash-plate-body member and said guide-bracket member.

6. A variable capacity swash-plate-type refrigerant compressor according to claim 1, wherein said swash-plate-body member of said swash-plate element is made of an aluminum alloy material, and said guide-bracket member of said swash-plate element is made of an iron based material.

7. A variable capacity swash-plate-type refrigerant compressor according to claim 6, wherein said aluminum alloy material of said swash-plate-body member is a hyper-eutectic aluminum-silicon alloy.

8. A variable capacity swash-plate-type refrigerant compressor according to claim 1, wherein said swash-plate element comprises a first predetermined portion formed in said guide-bracket member so as to be arranged adjacent to a top dead center of said swash-plate element, a second predetermined portion formed in the guide-bracket member so as to be arranged adjacent to a bottom dead center of said swash-plate element, and a weight element attached to said second predetermined portion to form a counterweight against the weight of said first predetermined portion, said weight element being arranged to be parallel with an outer circumferential portion of said swash-plate-body member and attached to said second predetermined portion of said guide-bracket member by a connecting means which is also engaged with said swash-plate-body member so that said connecting means constitutes said rotation-preventing-unit.

9. A variable capacity swash-plate-type refrigerant compressor according to claim 8, wherein said connecting means comprises a screw element threadedly engaged into said guide-bracket member and said swash-plate-body member of said swash-plate element.

10. A variable capacity swash-plate-type refrigerant compressor according to claim 1, wherein said guide-bracket member of said swash-plate element is provided with a front protrusion having an end face cooperating with a rotor element fixedly mounted on said drive shaft to determine a maximum angle of inclination of said swash-plate element with respect to a plane perpendicular to an axis of rotation of said drive shaft.

* * * * *

UNITED STATES PATENT AND TRADEMARK OFFICE
CERTIFICATE OF CORRECTION

PATENT NO. : 5,984,643
DATED : November 16, 1999
INVENTOR(S) : Masaki Ota; Yasunori Makino; Masaru Hamasaki; Masayoshi Hori It is certified that error appears in the above-identified patent and that said Letters Patent is hereby corrected as shown below:

On the title page, item [30], the correction should be 9-251561"

Signed and Sealed this

Twelfth Day of December, 2000

Q. TODD DICKINSON

*Attest:*

*Attesting Officer*   *Director of Patents and Trademarks*